United States Patent [19]

Onishi et al.

[11] 4,363,952
[45] Dec. 14, 1982

[54] WELDING METHOD FOR STAINLESS STEEL WELD OVERLAY

[75] Inventors: Keizo Onishi; Takao Adachi; Akiyoshi Fuji; Ryuichi Chiba, all of Muroran; Katsuyuki Naitoh, Yokohama; Hachiro Okada, Tokyo, all of Japan

[73] Assignees: Japan Steel Works, Ltd.; Chiyoda Chem. Engineering & Construction Co., both of Kanagawa, Japan

[21] Appl. No.: 119,772

[22] Filed: Feb. 8, 1980

[30] Foreign Application Priority Data

Feb. 9, 1979 [JP] Japan ................................. 54-13286

[51] Int. Cl.³ .......................... B23K 9/04; B23K 35/34
[52] U.S. Cl. ............................... 219/76.12; 219/76.14; 219/146.41
[58] Field of Search ................. 219/76.1, 76.12, 76.14, 219/146.23, 146.41

[56] References Cited

U.S. PATENT DOCUMENTS

| 3,975,610 | 8/1976 | Bagshaw et al. | 219/76.14 X |
| 4,143,258 | 3/1979 | McCann et al. | 219/76.14 X |
| 4,224,360 | 9/1980 | Ohnishi et al. | 427/239 |

FOREIGN PATENT DOCUMENTS

| 764377 | 8/1971 | Belgium | 219/76.1 |
| 2542081 | 3/1977 | Fed. Rep. of Germany | 219/76.12 |
| 2095416 | 2/1972 | France | 219/146.23 |
| 46-15409 | 4/1971 | Japan | 219/76.12 |
| 46-24528 | 7/1971 | Japan | 219/146.23 |
| 52-52140 | 4/1977 | Japan | 219/146.23 |
| 52-72347 | 6/1977 | Japan | |
| 54-107453 | 8/1979 | Japan | |
| 54-112721 | 9/1979 | Japan | 219/146.23 |
| 721297 | 3/1980 | U.S.S.R. | 219/146.23 |

OTHER PUBLICATIONS

Lary, Howard B; *Modern Welding Technology;* Prentice-Hall Inc., Englewood Cliffs, N.J., 1979; pp. 666-673; TK 4660 C37.

*Metals Handbook*, 8th Edition, vol. 6, "Welding and Braizing", p. 457; American Society for Metals; Metals Park, Ohio; 1971; TA 472 A3.

*Primary Examiner*—Gene Z. Rubinson
*Assistant Examiner*—Keith E. George
*Attorney, Agent, or Firm*—Wenderoth, Lind & Ponack

[57] ABSTRACT

A method for overlay welding of stainless steel on the inner surfaces of pressure vessels as used for treating hydrogen at elevated temperature, e.g. below 450° C. and under high pressure, e.g. below 150 kg/cm², is provided wherein, in order to prevent the disbonding of the welded stainless steel, as the 1st layer weld overlay including martensitic structure of 4 to 40% by area or additionally including ferritic structure of up to 8% by area is used. For this purpose the chemical composition of the stainless steel weld metal is defined as essentially comprising of up to 0.1% C, up to 1.0% Si, up to 2.0% Mn, 7 to 12% Ni, 12 to 18% Cr, up to 1.0% Mo, and up to 0.1% Al, the balance being Fe. The stainless steel weld overlay may further include Nb of above 8 times the carbon content but up to 1.0%.

4 Claims, 3 Drawing Figures

AFTER BEING HELD IN HYDROGEN UNDER A PRESSURE OF 150Kg/cm² AND A TEMPERATURE OF 450°C FOR 24HRS, COOLED IN AIR. "A":AUSTENITE ; "M":MARTENSITE; "F":FERRITE.

WELDING METHOD FOR STAINLESS STEEL WELD OVERLAY

BACKGROUND OF THE INVENTION

The present invention relates to a method for overlay welding of stainless steel on the inner surface of pressure vessels which are used in treating hydrogen at elevated temperatures and under high pressure.

The inner surfaces of the pressure vessels used for desulphurization and hydrocracking processes in oil refineries are usually overlaid with a stainless steel having a thickness of 4.5 to 8 mm for the prevention of corrosion. In the processes atomic hydrogen is absorbed from the surface of the stainless steel weld overlay and diffused into the base metal, and also it is diffused partially through out the wall of the base metal at elevated temperature and under high pressure. In this case, when the temperature of the vessel is lowered on shutdown of the plant, the hydrogen absorbed within the vessel wall makes the boundary layer between the stainless steel and the base metal brittle so that sometimes a cracking known as disbonding similar to a delayed failure may occur. Thus, the hydrogen in the boundary layer accumulates in the inside of the cracks which promotes the occurrence of blisters or surface cracks in the weld overlay. Therefore, it causes serious problems for the safety of the plant.

However, hitherto no systematic study has been carried out on the phenomenon of disbonding, so its causes and mechanism were not clear, but recent studies have pointed out that the principal origin of the disbonding resides in the difference of hydrogen solubility between the weld overlay of austenitic stainless steel and the ferritic base metal, or in the difference of heat expansion, and the microstructure in the boundary layer having a strong susceptibility to hydrogen embrittlement caused in a dissimilar weldment.

That is, according to the studies, since hydrogen absorbed in the wall of a vessel during operation makes the boundary layer between the base metal and the stainless steel weld overlay brittle, so it was considered that the cracks would be initiated and propagated due to increasing hydrogen gas pressure in the void and residual stress in the welded zone.

As the result of the studies by the inventors on methods of overlay welding which can prevent the disbonding a method was found which could attain this purpose by either a selection of a welding material, or the welding procedure of the first overlay cladding layer to be welded on the base metal has been improved.

SUMMARY OF THE INVENTION

It is an object of the present invention to provide an overlay welding method of welding stainless steel on the inner surface of a pressure vessel used for treating elevated temperature and high pressure hydrogen, which method can prevent cracking in the boundary layer between the stainless steel weld overlay and the base metal due to hydrogen this cracking phenomenon being known as disbonding, as already described above.

In accordance with the present invention a method for overlay welding of stainless steel on the inner surface of pressure vessels is provided in which a 1st layer of the austenitic stainless steel weld metal including a martensite structure of 4 to 40% by area or additionally including a ferrite structure up to 8% by area is used.

According to one aspect of the present invention the 1st layer weld metal to be welded on the base metal is defined as being essentially composed of up to 0.1 wt% C, up to 1.0 wt% Si, up to 2.0 wt% Mn, 7 to 12 wt% Ni, 12 to 18 wt% Cr, up to 1.0 wt% Mo, up to 0.1 wt% Al, the balance being Fe.

Besides, according to another aspect of the present invention the 1st layer weld metal may include additionally Nb above 8 times the carbon content and to a 1.0 wt% maximum.

BRIEF DESCRIPTION OF THE DRAWINGS

The above brief description, as well as further objects, features and advantages of the present invention will be more fully understood by reference to the following detailed description of the presently preferred, but nonetheless illustrative embodiments, in accordance with the present invention, when taken in conjunction with the accompanying drawings, wherein:

FIGS. 1-A and 1-B show a cross-sectional view of a base metal with stainless steel weld overlay applied with the present invention, wherein

DESCRIPTION OF THE PREFERRED EMBODIMENTS

As the result of detailed investigations by the inventors as to the origin of the disbonding occurring in the boundary layer between the stainless steel and the base metal due to hydrogen, they found that the disbonding depended upon the microstructure in the boundary layer between the austenitic stainless steel weld metal and the base metal, and confirmed also that it was possible to prevent the disbonding and achieve an improvement of the microstructure of the stainless steel weld overlay on the base metal as the 1st layer. That is, it is confirmed that the following microstructures are formed after post weld heat treatment.

(1) a coarse grained austenitic microstructure with an intergranular carbide precipitation;
(2) a martensite structure in the fusion zone;
(3) a coarse grained microstructure in the heat affected zone of the base metal which is decarburized.

Then, it was found that the disbonding was apt to propagate almost along the grain boundary of the coarse grained austenitic weld metal which was formed in parallel with the fusion zone as microstructures described above. Therefore, it can be presumed that, if an attempt is made to form a proper microstructure by modification of the welding condition and the microstructure of the weld metal is made to comprise two phases of austenite and martensite structures or three phases of austenite, martensite and ferrite structures, and if at the same time, the formation of the coarse grain austenite structure elongated along the fusion zone is prevented, the result is that disbonding resistance must be remarkably improved. In fact, this was confirmed by the following tests.

Figure 1A:
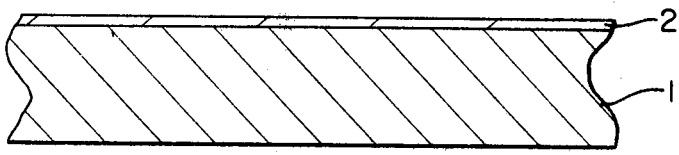
FIG. 1A shows the overlaid material of a 1st layer comprising two phases of austenite and martensite structures, or three phases of austenite, martensite and ferrite structures.
Figure 1B:
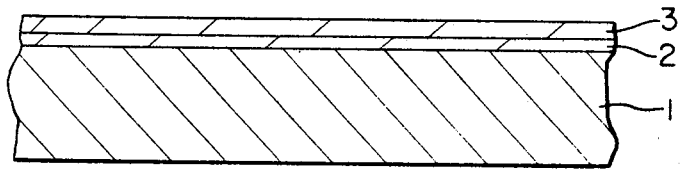
FIG. 1B shows the overlaid material of a 2nd layer, wherein, the 1st layer weld metal comprising two phases of austenite and martensite structures or three phases of austenite, martensite and ferrite structures was used. The 2nd layer weld overlay was prepared with a stainless steel applied by a conventional welding procedure.

FIG. 1A shows the cross sectional view of an overlaid material in which is applied a $2\frac{1}{4}$% Cr-1% Mo steel as the base metal having a thickness of 80 to 100 mm with a single layer weld overlay welded using a stainless steel strip (thickness 0.4 mm; width 75 mm) of the Types 308 and 309 (the reference numeral 2 shows the weld metal), FIG. 1B shows the cross sectional view of the overlaid material applied as the 1st layer weld overlay as in FIG. 1A and further welded a 2nd layer weld overlay using a Type 347 stainless steel strip (thickness 0.4 mm; width 75 mm). (The reference numeral 3 shows the 2nd layer weld overlay.) In both cases, welding current was varied within the ranges of 1,000 to 2,800 ampere and also welding speed was varied over 5 to 50 cm/min. in the welding of 1st layer overlay, so that the microstructure of the weld metals which could be classified into the following four kinds by the dilution of the chemical composition of the weld metals were obtained, i.e. (a) austenite; (b) austenite+ferrite; (c) austenite+martensite; and (d) austenite+martensite+ferrite.

In order to examine the disbonding resistance of the stainless steel weld overlay due to hydrogen embrittlement, test pieces were put into an autoclave and exposed in a hydrogen environment under a pressure of 150 kg/cm$^2$ and at a temperature of 400° C. for 24 hours. The test pieces, being of dimensions 45 mm thick (including the thickness of the weld overlay of 4 to 7 mm), 55 mm wide and 110 mm long, were taken from the material given post weld heat treatment at 680° C. for 16 hours or at 690° C. for 30 hours.

The test pieces which were charged with hydrogen in the autoclave and were inspected by an ultrasonic testing apparatus for the detection of any disbonding. A relationship between the disbonding behavior and the microstructure of the 1st layer weld overlay is shown in the Schaeffler's diagram, FIG. 2.

Figure 2:
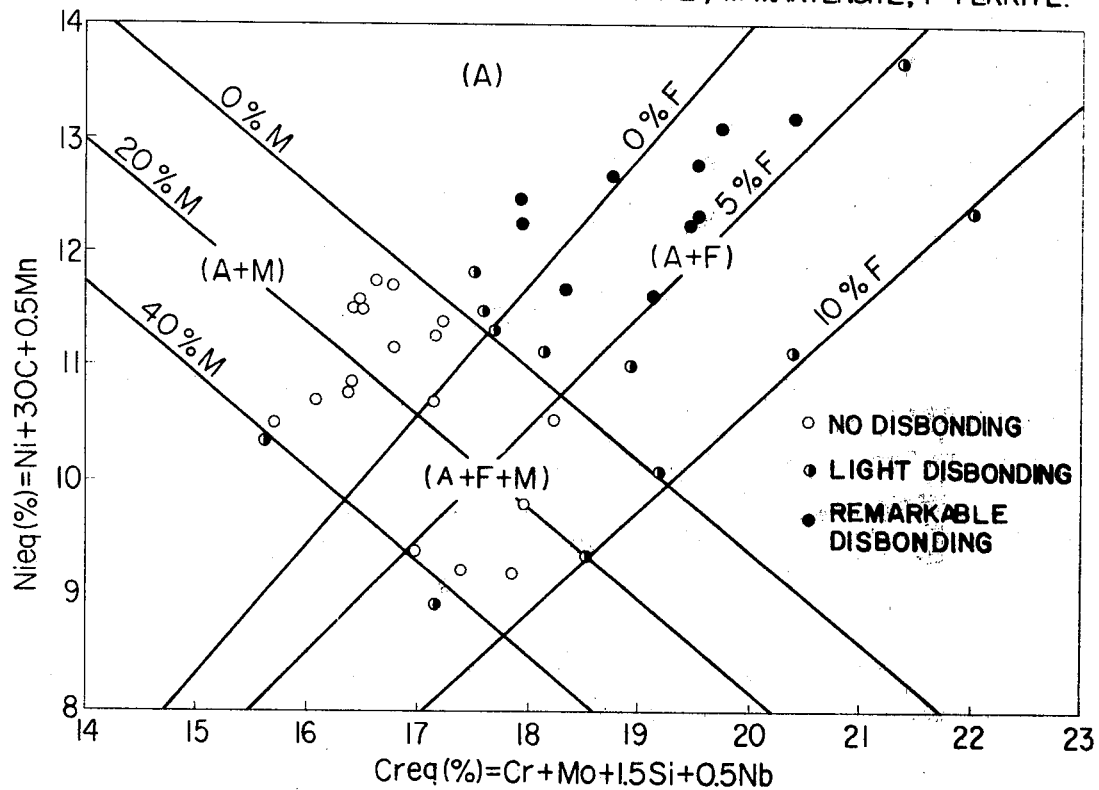
FIG. 2 shows a part of the Schaeffler's diagram which indicates the microstructures of stainless steel weld metals on a 1st layer weld overlay. Correlation with the microstructure and degree of disbonding resistance on the overlaid materials strip-welded with a Type 308 or a Type 309 austenitic stainless steel electrode are shown in the diagram shown in FIG. 2. The disbonding resistance was tested by exposing the overlaid material in a hydrogen environment to an elevated temperature and high pressure using an autoclave.

From FIG. 2 it will be appreciated that, both the weld overlays with a two phase microstructure composed of austenite and martensite and a three phase microstructure composed of austenite, martensite and ferrite have excellent disbonding resistance. In comparison to these, both the weld overlays with a single phase of austenite and two phases composed of austenite and ferrite obtained by conventional welding conditions have inferior disbonding resistance.

From the foregoing test results it will be understood that disbonding behavior is strongly dependent on the microstructure of the 1st layer weld metal, and the conventional welding condition produces a coarse grained austenite microstructure in the boundary layer between the weld overlay and the base metal, resulting in the precipitation of grainboundary carbides due to post weld heat treatment, so that disbonding occurs easily. However when a martensite structure exists in an austenite matrix or at the grainboundary, precipitation of the grainboundary carbides is suppressed, and also formation of the elongated coarse grained austenite along the fusion zone is prevented because solubility of carbon is larger in martensite than in austenite. Thus, the tests show that disbonding in a weld overlay can be prevented by lowering sensitivity of the weld metal to hydrogen embrittlement. In addition to that, although ferrite contained in the weld metal contributes to prevention of the hot cracking of austenite, it does not fulfil the remarkable role of preventing disbonding.

Consequently, the present invention is characterized in that the method for preventing the disbonding of a stainless steel weld overlay can be applied to the inner surface of pressure vessels. In this case, it should be defined that the 1st layer weld overlay contains the martensite microstructure to more than 4%, and 40% maximum by area in an austenite matrix, and the hydrogen partial pressure and temperature in operation using pressure vessels with the stainless steel weld overlay have to be kept below 150 kg/cm$^2$ and 450° C. respectively. In the case of reference to FIG. 2, it will also be understood that even if in addition to the martensite microstructure of more than 4%, and 40% maximum by area, the ferritic microstructure up to 8% by area is contained to form a three phase structure, which gives a weld metal having an equivalent disbonding resistance to that of the two phase structure. Therefore, the present invention proposes also to provide a 1st layer stainless steel weld overlay including a martensite structure of more than 4%, and 40% maximum by area and a maximum 8% ferrite structure by area.

Of course, if required, a conventional austenitic stainless steel weld overlay which is composed of austenite or austenite ferrite structures may be applied as the 2nd or more multi layers. For this purpose, in the present invention a suitable amount of martensite structure is formed in the austenite matrix by either defining the chemical compositions of the 1st layer weld metal or selecting the welding conditions.

At this point, the reasons why the area percentages of martensite and ferrite structure in the 1st layer weld metal in the present invention are thus defined reside in the following: since if the weld metal is composed of an austenite structure, the disbonding resistance becomes inferior, and hot cracking occurs easily at the overlay welding, therefore, a martensite content of at least 4% by area is required prevent the occurrence. The greater the area percentage the more the deleterious effects are revealed. However, as shown in FIG. 2, if the area percentage exceeds 40%, the disbonding resistance is affected and furthermore the susceptibility of the weld metal to hydrogen embrittlement itself is increased. Thus, the proper range of the martensite content was selected to be 4 to 40%. Further, when martensite exists in an austenite matrix, ferrite is not necessarily required for the prevention of hot cracking, but as the result of investigation, it was confirmed that ferrite structure revealed is effective to prevent hot cracking when the martensite content was relatively low, or a weld metal having a high susceptibility to hot cracking was adopted. However, if the ferrite content exceeds 8%, the disbonding resistance is impaired, and also embrittlement due to sigmatization is apt to be caused, therefore the upper limit of the ferrite content is defined as 8%.

Further, it should be added that the reasons for defining the chemical composition of the weld metal of the present invention is to ensure good mechanical properties, corrosion resistance and weldability of the weld metal, and also formation of a suitable amount of a martensite structure or martensite and ferrite structures in the austenite matrix.

Now the reasons why the respective components of the weld metal are defined are explained fully as follows:

It is desirable that carbon content be as low as possible to maintain the corrosion resistance of the stainless steels, but taking into consideration carbon migration from the base metal to the stainless steel weld metal in post weld heat treatment, the upper limit is defined as 0.1%.

Silicon and manganese are necessary as a deoxidizer of the weld metal, the former and the latter being ferrite and austenite formers, respectively, both elements having an influence on the microstructure of the weld metal. Therefore, taking into consideration the facts described above, the upper limits of the silicon and manganese content are defined as 1.0% and 2.0%, respectively.

Nickel and chromium are fundamental elements to maintain the corrosion resistance of the weld metal, and nickel above 8% and chromium above 18% are usually contained in austenitic stainless steels, but since in the present invention it is necessary to select such chemical composition ranges as to form a martensite structure in an austenite matrix, as their proper ranges, 7 to 12% and 12 to 18% are selected for nickel and chromium, respectively.

Molybdenum is required to improve corrosion resistance of stainless steels and is also effective for maintaining the strength of the steels at high temperatures. However, if the molybdenum content is increased too much, the sigma phase precipitation will be accelerated because molybdenum is a ferrite former, as a result of which the weld metal is impaired in terms of corrosion resistance and also impact properties. Therefore, the upper limit is defined as 1.0%.

Aluminum is used as a deoxidizer and is necessary for refining the grain size of the weld metal. However, if it is added in excess the cleanliness of the weld metals will be deteriorated, as will the corrosion resistance. Therefore, the upper limit is defined as 0.1%.

Niobium is a strong carbide forming element and is necessary to fix the carbon as a carbide in the weld metal to improve intergranular corrosion resistance. In order to fix the carbon fully a niobium content more than 8 times the carbon content is necessary. However, as it is a ferrite forming element, excess addition of this element makes a sigma phase precipitate remarkably, so its upper limit is defined as 1.0% as an optimum composition range.

Next the explanation of the preferred embodiments of the present invention will be given as follows:

Table 1 shows chemical compositions of 1st layer stainless steel weld metals welded with a 75 mm wide strip electrode on a 2¼% Cr-1% Mo base metal, and the microstructures were estimated from the Schaeffler's diagram. In Table 1, the specimens Nos. 1 to 9 shown are examples of the weld metal applied with the present invention in which the weld metals were prepared so as to have their chemical compositions controlled so that martensite or martensite and ferrite structure was formed in the austenite matrix. Among these the example Nos. 1 to 5 show the weld metals of Ni-Cr-Mo series, and Nos. 6 to 9 show Ni-Cr-Mo-Nb series. The example Nos. 10 to 13 show weld metals of Types 309 and 347 which were applied with a conventional welding procedure.

Table 2 shows the test results on the disbonding resistance of the materials shown in Table 1. In the tests the overlaid materials were exposed in hydrogen under a pressure of 150 kg/cm$^2$ and at a temperature of 450° C. as described already. Side bent test results on the materials are also shown in Table 2. As apparent from Table 2, no disbonding was detected in the overlaid material which was applied with the present invention, even if in a case of more severe exposure in a hydrogen environment than that shown in FIG. 2, and also all had excellent bend properties.

Thus, it will be appreciated that the present invention provides a weld overlay having excellent disbond resistance, when the welding procedure is applied to the inner surfaces of pressure vessels used for hydrogen treating processes at elevated temperature and under high pressure. And so a desirable weld overlay will be obtained by the selection of the welding conditions, or by controlling the chemical composition of the weld metal. As the result, the microstructure of the weld metal is made of a two phase microstructure comprising an austenite phase and martensite phase, or a three phase microstructure comprising austenite, martensite and ferrite. By the use of such structures, the formation of a coarse grained austenite microstructure elongating along the fusion zone of the overlaid material can be prevented. Further, according to the present invention, of the stainless steel weld overlay due to hydrogen embrittlement can be effectively prevented, and the weld overlay nevertheless possesses sufficient ductility.

Therefore, by adopting the present invention, all of the defects relating to disbonding due to the conventional overlay welding procedure can be fully eliminated, so that the safety of the equipment is assured.

TABLE 1

| No. | Item | Principal Chemical Composition | C | Si | Mn | Ni | Cr | Mo | Al | Nb | Microstructure* |
|---|---|---|---|---|---|---|---|---|---|---|---|
| 1 | Example 1 | 16Cr—8Ni | 0.076 | 0.52 | 1.43 | 8.33 | 16.14 | 0.37 | 0.015 | 0.01 | A + 5% M |
| 2 | Example 2 | 15Cr—7Ni | 0.078 | 0.46 | 1.36 | 7.66 | 15.32 | 0.41 | 0.010 | 0.01 | A + 25% M |
| 3 | Example 3 | 13Cr—10Ni | 0.057 | 0.54 | 1.43 | 10.65 | 13.25 | 0.38 | 0.035 | 0.01 | A + 13% M |
| 4 | Example 4 | 12Cr—11Ni | 0.071 | 0.51 | 1.40 | 11.14 | 12.01 | 0.42 | 0.040 | 0.01 | A + 10% M |
| 5 | Example 5 | 17Cr—7Ni | 0.043 | 0.52 | 1.35 | 7.55 | 16.83 | 0.51 | 0.015 | 0.01 | A + 22% M + 8% F |
| 6 | Example 6 | 16Cr—8Ni—Nb | 0.063 | 0.29 | 1.76 | 8.51 | 16.40 | 0.21 | 0.012 | 0.55 | A + 4% M |
| 7 | Example 7 | 15Cr—9Ni—Nb | 0.061 | 0.44 | 1.71 | 9.24 | 15.34 | 0.32 | 0.011 | 0.63 | A + 5% M |
| 8 | Example 8 | 13Cr—10Ni—Nb | 0.067 | 0.37 | 1.62 | 10.15 | 13.32 | 0.21 | 0.043 | 0.61 | A + 15% M |
| 9 | Example 9 | 12Cr—11Ni—Nb | 0.065 | 0.46 | 1.59 | 11.32 | 12.65 | 0.19 | 0.039 | 0.59 | A + 10% M |
| 10 | Reference 1 | 18Cr—10Ni | 0.061 | 0.40 | 1.41 | 10.29 | 18.46 | 0.25 | 0.010 | 0.01 | A + 1% F |
| 11 | Reference 2 | 19Cr—10Ni | 0.056 | 0.57 | 1.54 | 10.62 | 19.19 | 0.21 | 0.011 | 0.01 | A + 2.5% F |
| 12 | Reference 3 | 18Cr—10Ni—Nb | 0.054 | 0.59 | 1.65 | 10.64 | 18.47 | 0.16 | 0.013 | 0.56 | A + 2% F |
| 13 | Reference 4 | 20Cr—11Ni—Nb | 0.061 | 0.44 | 1.70 | 11.16 | 20.73 | 0.16 | 0.017 | 0.56 | A + 7% F |

*Note:
"A", "M" and "F" show "austenite", "martensite" and "ferrite", respectively.

TABLE 2

| No. | Item | Principal Chemical Composition | Micro-structure[1] | Post Weld Heat Treatment[2] | Side Bend Test[3] | Disbonding Test[4] |
|---|---|---|---|---|---|---|
| 1 | Example 1 | 16Cr—8Ni | A + 5% M | 680° C. × 16 hr & 690° C. × 30 hr | Good | No Disbonding |
| 2 | Example 2 | 15Cr—7Ni | A + 25% M | 680° C. × 16 hr & 690° C. × 30 hr | " | " |
| 3 | Example 3 | 13Cr—10Ni | A + 13% M | 680° C. × 16 hr & 690° C. × 30 hr | " | " |
| 4 | Example 4 | 12Cr—11Ni | A + 10% M | 680° C. × 16 hr & 690° C. × 30 hr | " | " |
| 5 | Example 5 | 17Cr—7Ni | A + 22% M + 8% F | 680° C. × 16 hr & 690° C. × 30 hr | " | " |
| 6 | Example 6 | 16Cr—8Ni—Nb | A + 4% M | 680° C. × 16 hr & 690° C. × 30 hr | " | " |
| 7 | Example 7 | 15Cr—9Ni—Nb | A + 5% M | 680° C. × 16 hr & 690° C. × 30 hr | " | " |
| 8 | Example 8 | 13Cr—10Ni—Nb | A + 15% M | 680° C. × 16 hr & 690° C. × 30 hr | " | " |
| 9 | Example 9 | 12Cr—11Ni—Nb | A + 10% M | 680° C. × 16 hr & 690° C. × 30 hr | " | " |
| 10 | Reference 1 | 18Cr—10Ni | A + 1% F | 680° C. × 16 hr & 690° C. × 30 hr | " | Remarkable Disbonding |
| 11 | Reference 2 | 19Cr—10Ni | A + 2.5% F | 680° C. × 16 hr & 690° C. × 30 hr | " | " |
| 12 | Reference 3 | 18Cr—10Ni—Nb | A + 2% F | 680° C. × 16 hr & 690° C. × 30 hr | " | " |
| 13 | Reference 4 | 20Cr—11Ni—Nb | A + 7% F | 680° C. × 16 hr & 690° C. × 30 hr | " | " |

Note:
[1]"A", "M" and "F" show "austenite", "martensite" and "ferrite", respectively.
[2]In FIG. 2 the results obtained in the case of the heat treatment of 680° C. × 16 hr are plotted.
[3]Bending Radius = 20 mm; Bending Angle = 180° C.
[4]After being held in hydrogen under a pressure of 150 kg/cm$^2$ and at a temperature of 450° C. for 24 hr, cooled in air.

What is claimed is:

1. In a method for the overlay welding of at least one weld layer onto the inner surfaces of pressure vessels made of carbon and low alloy steels as a base metal and used in processes in which hydrogen is contained within the vessels at elevated temperatures and under high pressure, the improvement which comprises welding a first layer weld overlay onto the inner surface of a pressure vessel, consisting essentially of up to 0.1 wt% C, up to 1.0 wt% Si, up to 2.0 wt% Mn, 7 to 12 wt% Ni, 12 to 17 wt% Cr, up to 1.0 wt% Mo, up to 0.1 wt% Al, the balance being Fe, said first layer weld overlay being welded at a welding current within the range of 1000-2800 amperes and at a welding speed varying between 5 to 50 cm/min. so as to produce a weld structure selected from (1) a martensite structure in an amount of 4% to 40% by area in an austenite matrix or (2) a martensite structure in an amount of 4% to 40% by area and a ferrite structure in an amount below 8% by area both within an austenite matrix.

2. A method according to claim 1 in which the first layer weld overlay has a martensite structure in an amount of 4% to 40% by area in an austenite matrix.

3. A method according to claim 1 in which the first layer weld overlay has a martensite structure in an amount of 4% to 40% by area and a ferrite structure in an amount below 8% by area, both within an austenite matrix.

4. A method according to claim 1 in which the first layer weld overlay further contains Nb in an amount more than 8 times the carbon content, up to 1.0 wt%.

* * * * *